US012800113B2

(12) United States Patent
Sjöberg et al.

(10) Patent No.: US 12,800,113 B2
(45) Date of Patent: Nov. 17, 2026

(54) DEVICE AND METHOD FOR DRYING A NOZZLE FOR LIQUIFIED GAS

(71) Applicant: MANN TEKNIK AB, Mariestad (SE)

(72) Inventors: Andreas Sjöberg, Mariestad (SE); Karl-Gustav Wannberg, Töreboda (SE)

(73) Assignee: MANN TEKNIK AB, Mariestad (SE)

( * ) Notice: Subject to any disclaimer, the term of this patent is extended or adjusted under 35 U.S.C. 154(b) by 476 days.

(21) Appl. No.: 18/283,096

(22) PCT Filed: Apr. 21, 2022

(86) PCT No.: PCT/SE2022/050390
§ 371 (c)(1),
(2) Date: Sep. 20, 2023

(87) PCT Pub. No.: WO2022/225442
PCT Pub. Date: Oct. 27, 2022

(65) Prior Publication Data
US 2024/0035625 A1 Feb. 1, 2024

(30) Foreign Application Priority Data
Apr. 22, 2021 (SE) .................................... 2150509-4

(51) Int. Cl.
*F17C 13/10* (2006.01)
*F17C 5/02* (2006.01)

(52) U.S. Cl.
CPC ................ *F17C 13/10* (2013.01); *F17C 5/02* (2013.01); *F17C 2205/037* (2013.01); *F17C 2260/032* (2013.01)

(58) Field of Classification Search
CPC .................................. F17C 5/02; F17C 13/10
See application file for complete search history.

(56) References Cited

U.S. PATENT DOCUMENTS

| | | | | |
|---|---|---|---|---|
| 2,593,916 A * | 4/1952 | Peff | F17C 9/02 62/DIG. 13 |
| 2005/0241632 A1 | 11/2005 | Alfoldi et al. | |
| 2017/0341769 A1* | 11/2017 | Haberbusch | F17C 5/007 |
| 2018/0266633 A1 | 9/2018 | Fujita | |

FOREIGN PATENT DOCUMENTS

| | | | |
|---|---|---|---|
| JP | 2018-168890 A | 11/2018 | |
| KR | 102817644 B1 * | 6/2025 | H05B 3/34 |
| NL | 1041574 A | 6/2017 | |
| WO | WO-03046432 A2 * | 6/2003 | F17C 9/02 |

OTHER PUBLICATIONS

International Search Report, issued in PCT/SE2022/050390, dated Jul. 21, 2022.
Written Opinion of the International Searching Authority, issued in PCT/SE2022/050390, dated Jul. 21, 2022.

* cited by examiner

*Primary Examiner* — Ngoc T Nguyen
(74) *Attorney, Agent, or Firm* — Birch, Stewart, Kolasch & Birch, LLP

(57) ABSTRACT

A device for drying a nozzle for liquefied gas included a first member for receiving the nozzle adapted to heat a heating unit, a heat storage, a pneumatic inlet, a pneumatic outlet, and a channel connecting the pneumatic inlet to the pneumatic outlet. The pneumatic outlet is arranged in the first member and the channel is arranged such that a pneumatic flow within the channel is heated by the heat storage.

19 Claims, 2 Drawing Sheets

DEVICE AND METHOD FOR DRYING A NOZZLE FOR LIQUIFIED GAS

TECHNICAL FIELD

The present invention relates generally to a device and method for heating and drying a nozzle for liquified gas while the nozzle is parked and not used for transfer.

BACKGROUND ART

In prior art different solutions for transferring liquified gases are well known, for example one common solution is for fuel such as Liquefied Natural Gas, LNG, to be transferred from a fuel station to a vehicle. Other examples are liquified gases being transferred to/from ships, vehicles, or stationary tanks. In most applications such transfer of liquified gases requires at least one coupling or nozzle for connection and disconnection. As known in the art liquified gases requires less volume for storage, are safer to store, and safer to transfer in a liquid state than in its corresponding gas form. However, the low boiling point of useful gases requires many liquified gases to be stored at low temperatures. For example, in atmospheric pressure the gas for LNG is condensed to liquid at temperatures below approximately −160° C., liquid hydrogen, LH2, at temperatures below approximately −250° C., and nitrogen for liquid nitrogen, LN2, approximately −195° C.

Liquified gases are used for different purposes but independent of the purpose efficiency and safety are important factors. To provide one out of many examples, liquified gases may be used as fuel and need to be transferred from a fueling station to for example a truck. Although the transfer as such is well known in the art there are drawbacks in the art reducing the efficiency and possible occupancy level of for example a fueling station.

SUMMARY OF INVENTION

For the purpose of this disclosure, it shall be noted that the terms nozzle and coupling are used interchangeable to describe a unit to be dried by the device.

As common in the art, the nozzle could be made of metal with relatively good thermal conductivity. Transferring liquified gases, such as LNG or LN2, through a nozzle or coupling lowers the temperature of the nozzle/coupling and especially in the area closest to the unit to which the nozzle/coupling is connected. The temperature of the nozzle thus rapidly decreases during transfer of the liquified gas. The nozzle is simultaneously subjected to the temperatures of the surrounding air, in general a common outdoor environment. The temperature outside of the nozzle during transfer of liquified gas is significantly higher than the temperature of the liquefied gas. The low temperature of the nozzle makes humidity in the air condensate onto the nozzle that immediately freezes to ice due to the low temperature of the liquified gas that is transferred.

As previously exemplified, one embodiment wherein this problem is present is at fueling stations where nozzles for transferring LNG to trucks accumulate ice during fueling. Ice around the nozzle increases the risk of leakage, unintended disconnections, wear and tear to the nozzle, and presents a logistic problem at fuel station. Nozzles with accumulated ice often freeze in the engaged position making disconnection of the nozzle impossible. The same or similar problems are present in other application areas as well.

A liquified gas nozzle that is covered with ice or moist is not safe to use. Drying such nozzles provides a challenge given that liquified gas nozzles often are operated in areas with an explosive atmosphere and thus subject to vast safety requirements, such as the ATEX directives. Drying a nozzle is not a simple action of heating or drying it quickly using high power creating vast amount of heat. High power and high temperatures are two unwanted and dangerous parameters in areas with explosive atmospheres.

Thus, an object of the present invention is to mitigate at least some of the drawbacks of the prior art.

An object of the present solution is to dry the liquified gas nozzle safely.

Another object is to decrease the time required to dry the nozzle after it has been used to transfer a liquified gas.

Yet another object is to increase safety of the nozzle through providing reliable drying between use.

Thus, the solution relates to a device for drying a liquefied gas nozzle. The device comprises a first member for receiving the nozzle, a heating unit adapted to heat a heat storage, a pneumatic inlet, a pneumatic outlet, and a channel connecting the pneumatic inlet to the pneumatic outlet. The pneumatic outlet is arranged in the first member and the channel is arranged such that a pneumatic flow within the channel is heated by the heat storage.

One advantage is that the pneumatic flow utilizes heat from the heat storage and thus have access to more thermal energy than if a direct heat solution would be applied to the pneumatic flow. This enables the heat unit to operate at low power and the device to be more efficient. It further increases the time it takes for the pneumatic flow to cool the device, thus enabling a continuous temperature of the pneumatic flow during operation.

In one embodiment the first member for receiving the nozzle is a top region of the device wherein the nozzle is received in an opening. In another embodiment the nozzle is received over the first member, an advantage with such an embodiment is that the nozzle is enclosed by the first member providing improved heating and drying performance. In yet another embodiment the nozzle is attached to the device in the same way as the nozzle is attached during operation, in such an embodiment the first member comprises means to avoid actuating a valve of the nozzle such that any flow of liquefied gas is prevented.

In one embodiment the pneumatic flow is active during the drying cycle and otherwise inactive. A typical drying cycle could for example be 1-3, 2-5, 5-10, or 10-60 minutes, however longer or shorter drying cycles might be required dependent of the application area.

It is one advantage that the pneumatic flow is active only, or mostly, when the nozzle is present at the device. I.e., there is no need for the pneumatic flow to be constantly on. However, it shall be understood that within the scope of this disclosure is states wherein the pneumatic flow is turned on when the nozzle is arranged to the device, before the nozzle is arranged to the device, or after the nozzle is arranged to the device. A drying cycle could for example be a defined period of time that it normally takes to dry a nozzle, or a predetermined cycle ran by a processing means as part of an automated process to dry the nozzle. In another embodiment the drying cycle is manually determined by a user activating the pneumatic flow.

It is another advantage of the solution as disclosed herein that the pneumatic flow enables the moist dried from the nozzle to be transported away from the area of the first member. The pneumatic flow is in one embodiment released to the surrounding atmosphere after passing the nozzle, in another it is collected after passing the nozzle to avoid increasing the humidity in the area and/or preventing potentially toxic or otherwise dangerous remains of the liquified gas to be distributed in the surrounding air.

According to one embodiment the first member is an opening.

According to an embodiment the channel is longer than the distance between the inlet and the outlet to increase the contact area between the channel and the heat storage. It is preferred that the length of the channel is at least twice, more preferably at least three times the length of the shortest distance between the inlet and the outlet.

It is one advantage that a longer channel increases the distances and thus contact area between the channel and the heat storage. One example is wherein the channel is arranged in multiple turns around the heat storage. In another embodiment the channel is arranged in uneven twists and turns around or through the heat storage. In yet another embodiment the channel is arranged inside and/or as part of the heat storage.

According to one embodiment a sleeve is arranged surrounding the heat storage and the channel is created by the space between the heat storage and the sleeve.

According to one embodiment the channel is threaded into the heat storage such that the channel is a thread shaped recess in the heat storage.

In one embodiment the channel is a recess formed as an outside (also called male) thread around the heat storage and the sleeve is arranged to cover the open thread creating a channel between the lower parts of the thread shaped recess and the sleeve.

According to one embodiment the channel is a duct. For clarification, the terms might be used interchangeably herein.

According to one embodiment the channel is a duct in or around the heat storage.

The channel may also be explained as a conduit or duct for allowing the pneumatic flow to flow through, around, or in connection to the heat storage.

According to one embodiment the channel is threaded into the entire length of the heat storage.

According to one embodiment, the heating unit is an elongated heating unit extending into the channel such that the pneumatic flow within the channel is heated by both the heating unit and the heat storage.

It is one advantage that in one embodiment the pneumatic flow could be heated both with the heat from the heating unit and stored heat from the heat storage.

The elongated heating unit may for example be any one of a heat cable, a heat pipe, a pipe for transporting heated medium such as a water—ethylene glycol mixture, steam, or any other suitable medium for heating the heat storage via the elongated heating unit.

According to one embodiment the heat storage is a solid metal body, wherein the solid metal body is selected from any one of aluminum, cast metal, iron, stainless steel or any other suitable metal material with sufficiently high thermal inertia to allow it to function has a heat storage.

According to one embodiment the heat storage is a liquid storage wherein thermal energy is stored in a suitable liquid.

According to one embodiment the heating unit is any one of a heat cable, a pipe for hot liquid, and a pipe for hot gas.

According to one embodiment the heating unit is arranged as part of the heat storage.

According to one embodiment the device comprises a first actuator to activate the heating unit and a second actuator to activate the pneumatic flow.

To allow the heating unit to effectively heat the heat storage the pneumatic flow needs to be turned off after a nozzle been dried. This could be done by different sorts of second actuator means.

According to one embodiment the second actuator is actuated by insertion of the nozzle into the member.

According to one embodiment the second actuator is arranged to the distributing member such that when the nozzle is brought into engagement with the first member the second actuator is actuated allowing the pneumatic flow. In one embodiment the second actuator is a mechanical actuator, in another embodiment the actuator is a micro switch, switch, optic sensor, or any other form of electrical component. In yet another embodiment the second actuator is controlled by a digital processing means, such as a micro controller or CPU.

According to one embodiment, the device further comprises means for locking the nozzle in engagement with the first member.

According to one embodiment the device comprises computer means to run a pre-determined program for drying the nozzle.

According to one embodiment the nozzle is released once the pre-determined program for drying the nozzle is completed.

According to one embodiment the predetermined program for drying the nozzle further utilize input from a sensor arranged to detect if the nozzle is properly dried.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the invention is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the device or method.

Figure 1:
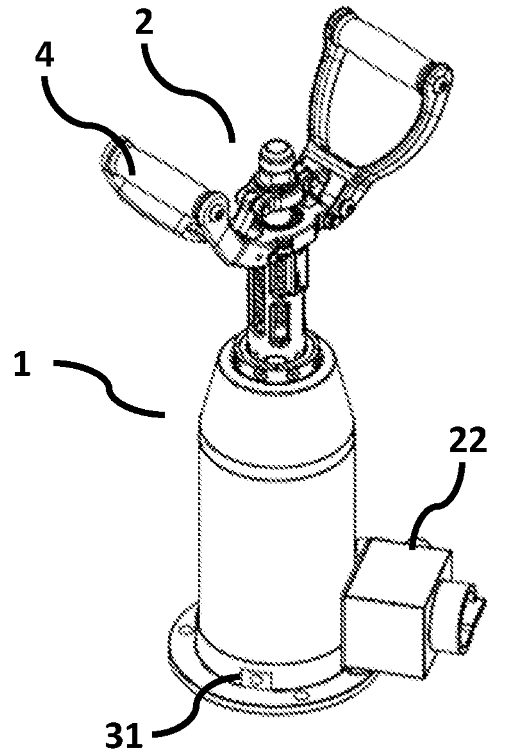
FIG. 1 illustrates one embodiment of a device for drying a liquefied gas nozzle wherein the nozzle is inserted into the device.
Figure 2:
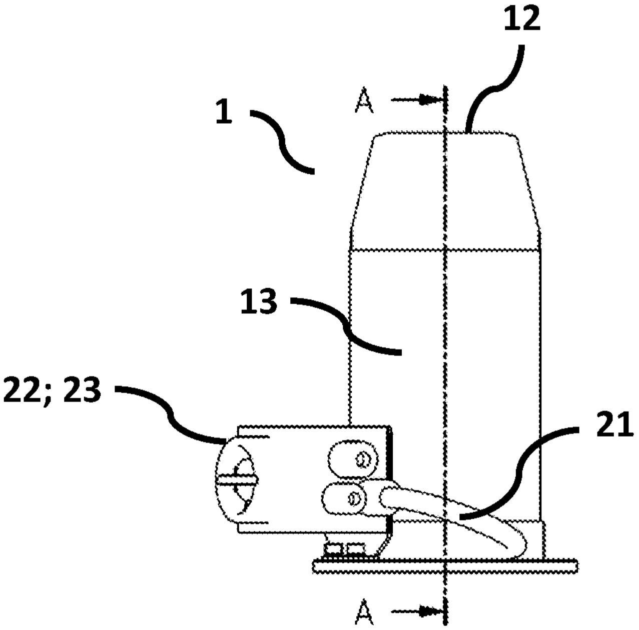
FIG. 2 illustrates one embodiment of a device for drying a liquefied gas nozzle.

FIGS. 1 and 2 illustrate one embodiment of the device for heating a nozzle wherein the nozzle 2 is inserted into the device 1 and with no nozzle inserted, respectively. The device 1 has in the illustrated embodiment a circular form but might have any form or shape suitable for the nozzle 2 it is adapted to dry. In a typical embodiment the device for heating the nozzle 2 is used as a parking spot for the nozzle 2 when not in use.

FIG. 1 further illustrates a nozzle 2 that for example could be a nozzle for LNG with a locking mechanism controlled by handles 4. However, in different embodiments the nozzle could be of other shapes and forms, for example nozzles that are rotated into engagement with their mating part such as a first member 12. For the disclosure herein it shall be noted that a nozzle 2 could be any form of coupling but to provide a few non limiting examples it could be an LNG nozzle or a dry cryogenic coupling. In one embodiment the device 1 comprises a first actuator 22 to activate a heating unit 21, see FIG. 2. The first actuator might for example be a switch, lever, or any other suitable actuator that enables the heating unit 21 to be turned on and off, i.e., the purpose of the first actuator as illustrated in FIG. 1 is to enable the heating unit 21. The heating unit 21 is adapted to heat a heat storage 14, see the cross-sectional view of FIG. 3, and maintain it at a suitable temperature. The heat storage 14, which may be solid, may be made by any suitable material, such as a metal, like aluminum, cast metal, iron, or stainless steel, with sufficiently high thermal inertia to allow it to function has a heat storage. In one embodiment the heating unit 21 is constantly active at times wherein a transfer of liquefied gas could be initiated, such as opening hours of a fuel station or harbor. In another embodiment a thermostat is arranged to control the heating unit 21 in order to keep the heat storage 14 at a suitable temperature. In another embodiment the heating unit 21 is constantly on, in yet another embodiment the heating unit 21 is constantly on if the first actuator 22 is turned on. The first actuator 22 does not have to be a physical actuator; in one embodiment it is a digital first actuator that is controlled by processing means either internally, externally at the local site, or in communication with the cloud.

FIG. 1 illustrates how a pneumatic inlet 31 in one embodiment is arranged in the lower part of the device 1 and adapted to receive a pneumatic flow from an external source. The pneumatic flow might be compressed air, nitrogen, or any other suitable gas. In the illustrated embodiment the pneumatic inlet 31 is arranged at the opposite end of the device 1 from the first member 12 and the outlet 32. The pneumatic inlet 31 is connected to a channel 30, see FIG. 3, wherein heat from the heat storage 14 is extracted to the pneumatic flow. The pneumatic inlet 31 thus could have other positions in relation to the first member 12 as long as the purpose of heating the pneumatic flow is achieved. It is preferred that the channel 30 is longer than the shortest distance L1, see FIG. 3, between the inlet 31 and the outlet 32 to increase the contact area between the channel 30 and the heat storage 14. It is preferred that the length of the channel is at least twice, more preferably at least three times the length of the shortest distance L1 between the inlet 31 and the outlet 32. This is in the shown embodiment accomplished by making the channel 30 helix shaped, i.e., wound around the heat storage 14. However, it is appreciated that other ways are to shape the channel 30 like a meander or other curved shapes, as long as the channel 30 makes contact with the heat storage 14.

FIG. 2 illustrates the device 1 wherein no nozzle 2 is present. The device 1 comprises the first member 12 being the part of the device 1 where the nozzle 2 is placed to be dried. In the embodiment as illustrated in FIG. 2 the first member 12 is an opening for receiving a nozzle 2. However, it shall be noted that the first member 12 might have other forms and shapes for engaging with the nozzle 2. Depending on the design of the nozzle 2 it might be heated with a pneumatic flow through the inside of for example a ball cage adapted to lock the nozzle 2 into engagement with another member during operation. In another embodiment the pneumatic flow could flow around the nozzle or coupling to dry it from the outside.

FIG. 2 further illustrates how the heating unit 21 extends into the device 1. The heating unit 21 could be arranged to only heat within the device 1 or for emitting heat along the entire length of the heating unit 21. In one embodiment, a sleeve 13 surrounds the heat storage 14. In one embodiment insulation is added along parts of the heating unit 21 that is exposed outside of the heat storage 14 and/or sleeve 13. The sleeve 13 might have different functions for the device 1 in different embodiment, for example to enclose the channel 30 as shown in FIG. 3 and/or as a heat protection to keep the outside of the device cold.

Figure 3:
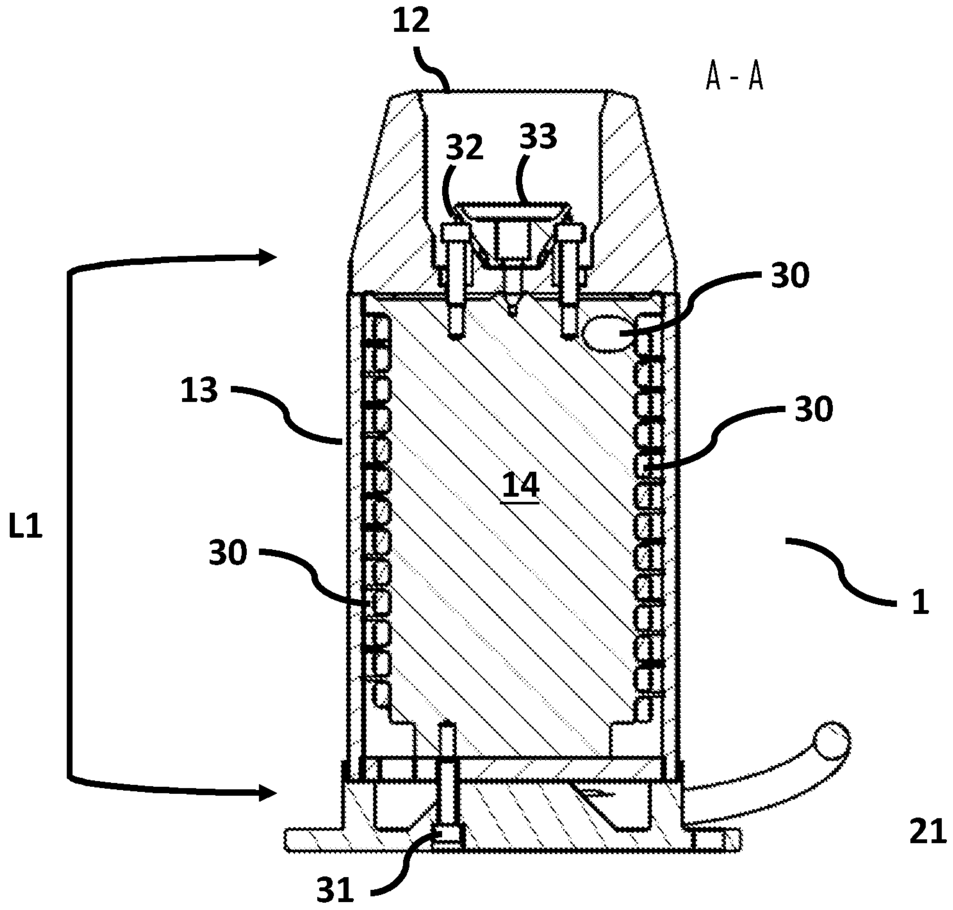
FIG. 3 illustrates a cross section of the embodiment as shown in FIG. 2.

FIG. 3 illustrates a cross section of a device 1 as shown in FIG. 2, wherein the heat storage 14 is clearly visible. In this particular embodiment the heat storage 14 is a round solid body. However, it might have any shape or form that is suitable for the nozzle or coupling that it is adapted to dry. FIG. 3 further illustrates how the channel 30 is threaded into the heat storage 14 and covered by the sleeve 13, i.e., in one illustrative embodiment of FIG. 3 the channel 30 is an outside thread of the heat storage 14 covered by a sleeve 13 mutually creating a channel 30 running around the heat storage 14 from bottom to the top. The pneumatic outlet 32 is further illustrated in the first member 12.

FIG. 3 further illustrates a clear advantage of the device 1 for drying a nozzle as disclosed herein. The pneumatic flow from the inlet 31 to the outlet 32 flows through the cannel 30 and is heated by heat from the heat storage 14. In the embodiment as illustrated in FIG. 3, the flow is also heated by the heating unit 21. Although this is only one example of how the channel 30 could be arranged it clearly shows the benefits of the solution. In order for the pneumatic flow to effectively dry the nozzle the temperature of the pneumatic flow needs to be increased from a surrounding indoor or outdoor temperature wherein for example a compressor for compressing air or tank comprising a compressed gas is arranged. The other parameter affecting the drying time is the pace of the pneumatic flow, for example measured in liters/minute. To enable that the temperature is increased enough without requirement of reducing the pace of the pneumatic flow the solution comprising a heat storage 14.

Figure 4:
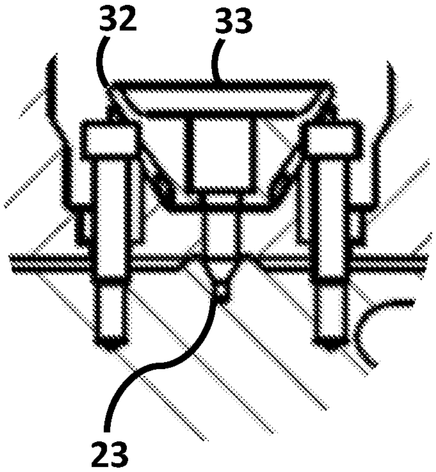
FIG. 4 illustrates one embodiment of an outlet for the pneumatic flow.

FIG. 4 illustrates a distributing member 33 arranged to distribute the flow from the pneumatic outlet 32 in a suitable manner for the nozzle to be dried. In one embodiment the distributing member 33 comprises means of a second actuator 23 for allowing or preventing a pneumatic flow through the outlet 32 such that when the nozzle is in place the pneumatic flow starts.

The invention claimed is:

1. A device for drying a nozzle for liquified gas, wherein the device comprises:

a first member for receiving the nozzle;

a heating unit adapted to heat a heat storage;

a pneumatic inlet;

a pneumatic outlet; and a channel connecting the pneumatic inlet to the pneumatic outlet, wherein the pneumatic outlet is arranged in the first member and the channel is arranged such that a pneumatic flow within the channel is heated by the heat storage, and wherein the heating unit is an elongated heating unit extending into the channel such that the pneumatic flow within the channel is heated by both the heating unit and the heat storage.

2. The device according to claim 1, wherein the channel is longer than a shortest distance between the inlet and the outlet to increase a contact area between the channel and the heat storage.

3. The device according to claim 2, wherein the device comprises a sleeve surrounding the heat storage and the channel is created by a space between the heat storage and the sleeve.

4. The device according to claim 1, wherein the device comprises a sleeve surrounding the heat storage and the channel is created by a space between the heat storage and the sleeve.

5. The device according to claim 1, wherein the channel is helix shaped.

6. The device according to claim 1, wherein the heat storage is a metal body.

7. The device according to claim 1, wherein the heating unit is any one of a heat cable, a pipe for hot liquid, and a pipe for hot gas.

8. The device according to claim 1, wherein the device comprises a first actuator to activate the heating unit and a second actuator to activate the pneumatic flow.

9. The device according to claim 8, wherein the second actuator is actuated by insertion of the nozzle into the member.

10. The device according to claim 1, wherein the device further comprise means for locking the nozzle in the first member, and wherein the device comprises computer means to run a pre-determined program for drying the nozzle, and wherein the nozzle is released once the program is completed.

11. The device according to claim 1, wherein the first member is an opening.

12. The device according to claim 1, wherein the device further is adapted to heat the nozzle.

13. A method for drying a nozzle for liquified gas with the device according to claim 1, wherein the method comprises the steps of:

inserting the nozzle into the first member;

actuating a second actuator thus activating the pneumatic flow; and removing the nozzle.

14. The method for drying a nozzle for liquified gas according to claim 13, wherein the method further comprises the steps of:

locking the nozzle to the device;

initiating a predetermined drying program wherein the nozzle is dried; and unlocking the nozzle from the device upon completion of said predetermined drying program.

15. The device according to claim 1, wherein the channel is at least twice the length of a shortest distance between the inlet and the outlet to increase a contact area between the channel and the heat storage.

16. The device according to claim 1, wherein the channel is at least three times the length of a shortest distance between the inlet and the outlet to increase a contact area between the channel and the heat storage.

17. The device according to claim 1, wherein the channel is a thread shaped recess in the heat storage.

18. The device according to claim 1, wherein the heat storage is a solid metal body.

19. The device according to claim 1, wherein the heat storage is a metal body made of any of the following: aluminum, cast metal, iron, stainless steel or any other suitable metal material with sufficiently high thermal inertia to allow it to function has a heat storage.

* * * * *